United States Patent
Ohta et al.

(10) Patent No.: US 6,825,440 B2
(45) Date of Patent: Nov. 30, 2004

(54) LASER BEAM MACHINING METHOD AND APPARATUS

(75) Inventors: Kazuyoshi Ohta, Miyamae-ku (JP); Naoshige Sasano, Sagaimihara (JP)

(73) Assignee: Moritax Corporation, Tokyo (JP)

( * ) Notice: Subject to any disclaimer, the term of this patent is extended or adjusted under 35 U.S.C. 154(b) by 0 days.

(21) Appl. No.: 10/141,911

(22) Filed: May 10, 2002

(65) Prior Publication Data
US 2002/0175151 A1 Nov. 28, 2002

(30) Foreign Application Priority Data
May 15, 2001 (JP) ........................................ 2001-145613

(51) Int. Cl.$^7$ ............................................. B23K 26/00
(52) U.S. Cl. ............................. 219/121.69; 219/121.68
(58) Field of Search ........................ 219/121.69, 121.68, 219/121.67, 121.85

(56) References Cited

U.S. PATENT DOCUMENTS

| | | | |
|---|---|---|---|
| 5,173,441 A | * | 12/1992 | Yu et al. ...................... 438/676 |
| 5,208,437 A | * | 5/1993 | Miyauchi et al. ...... 219/121.67 |
| 5,466,908 A | * | 11/1995 | Hosoya et al. ......... 219/121.68 |

* cited by examiner

Primary Examiner—M. Alexandra Elve
(74) Attorney, Agent, or Firm—Townsend & Banta (57) ABSTRACT

Disclosed is a laser beam machining method and apparatus for irradiating a work with a laser beam, to melt-evaporate the irradiated region of the work at the irradiation spot. According to the invention, a work such as an optical fiber can be machined into a complicated form within a short period of time without accurately controlling the laser beam irradiation position while inhibiting the decline of machining accuracy due to thermal effect, by using a mask having a light-transmitting section that is predetermined times as large as the laser beam machining spot corresponding to the form of the portion undergoing melt-evaporation of the work.

24 Claims, 5 Drawing Sheets

LASER BEAM MACHINING METHOD AND APPARATUS

FIELD OF THE INVENTION

The present invention relates to a laser beam machining method and apparatus for irradiating a work with a laser beam, to melt-evaporate the irradiated region of the work at the irradiation spot. Particularly the present invention provides a laser beam machining method and apparatus that can machine the tip portion of an optical fiber, as an example of the work, into a desired form.

BACKGROUND OF THE INVENTION

Optical fibers, for example, optical fibers mainly composed of quartz glass are used in optical transmission systems and other optical systems, and the tip forms of these optical fibers play an important role irrespective of kinds of fibers such as single mode fibers and multi-mode fibers.

It is desired that the end faces of an optical fiber have an especially smooth surface and an accurate form for minimizing the connection loss in its connection with another optical fiber or an active device. Therefore, it is desired that the method of machining the tip of an optical fiber can achieve accurate machining into a predetermined form at high productivity Known methods of finely processing the tip of an optical fiber include mechanical methods such as fiber cleaving, chemical methods such as etching and optical methods such as the use of a $CO_2$ laser, etc.

The mechanical method using a fiber cleaver allows the tip of an optical fiber to be simply and sharply cleaved, but has a problem that it cannot process the tip into a semispherical, conical, or wedge-like surface, etc.

The chemical method using etching allows the tip of an optical fiber to be formed as desired, but since it is difficult to control the form and takes a long period of time, the method has a problem in view of productivity.

In the case where the conventional general method of using a $CO_2$ laser is used to cut an optical fiber to process it at an end, it can happen that the heat generated during machining causes a form error, and since the spatial distribution of light intensities is Gaussian, there is such a problem that the machined edge becomes blunt.

Examples of these cases are described below.

For example, in the optical fiber cutting methods and apparatuses described in the gazettes of JP02-230205A and JP02-238406A, optical fibers are mechanically cut. These methods allow optical fibers to be cut easily and well, but cannot be used for processing the tips of optical fibers.

EP 0987570 discloses a method of cutting an optical fiber using a pulse $CO_2$ laser. In this method, a circular laser beam with Gaussian-distributed light intensities is merely condensed by a lens for cutting an optical fiber. The method cannot process the tip of the optical fiber into a desired form.

U.S. Pat. No. 5,256,851 discloses a method of melt-evaporating the tip of an optical fiber very little by very little using a pulsed $CO_2$ laser. This method has such problems that it takes a long period of time for predetermined machining.

In the above-mentioned machining method using a pulsed $CO_2$ laser, since the tip of an optical fiber to be differently formed depending on the applicable specifications must be processed into a desired form by repeating micro machining, the laser beam must be finely condensed like a point using a lens, for accurate processing into a desired form.

Therefore, the control of the laser beam irradiation position for adaptation to the form to be obtained at the tip of the optical fiber is troublesome, and expensive equipment is necessary for very highly accurate irradiation position control.

In addition, the spatial distribution of light intensities, i.e., profile of the light condensed by a lens becomes conical with the focus as the vertex, machining becomes difficult with the increase in the depth of the machined portion of the optical fiber. Furthermore, there is such a problem that since a thin V-shaped end face is formed in the section of the machined portion, the gas, fume and heat generated during machining are likely to be retained there, to contaminate or curve the machined surface.

Furthermore, if the pulsed $CO_2$ laser is used, since the tip of an optical fiber is irradiated with a laser beam having high light intensity continuously for a long time, the peripheral portion of the tip portion is also heated to deform the optical fiber, not allowing machining as designed. Moreover, if a pulse laser is used, the thermal effect on the optical fiber can be reduced, but there is another problem that the machining time becomes longer by that.

OBJECTS OF THE INVENTION

One of the objects of this invention is to provide a laser beam machining method and apparatus that can machine the tip of a work such as an optical fiber into a desired form highly accurately within a short period of time.

Another object of this invention is to provide a laser beam machining method and apparatus capable of preventing the vibration of the fiber caused by the ablation during laser beam irradiation and preventing the occurrence of facial sagging, that respectively lower the form accuracy at the cut face when the tip of an optical fiber is cut by means of laser beam machining.

SUMMARY OF THE INVENTION

To solve the above-mentioned problems, the present invention proposes a laser beam machining method, in which a work is irradiated with a laser beam to melt-evaporate the portion irradiated with the laser beam for machining the work, characterized in that a mask having a light-transmitting section that is predetermined times as large as the laser beam machining spot corresponding to the form of the portion undergoing melt-evaporation of the work, is disposed between a laser beam source and the work, and the laser beam transmitted from a laser beam source through a beam-shaping optical system is irradiated to said mask in a range larger than said light-transmitting section, and the real image of the light-transmitting section formed by the transmitted light is reduced to the size of said machining spot by means of a reduced image-forming optical system, to form the reduced image on the work, for machining.

According to this method, since the light-transmitting section that is predetermined times as large as the machining spot corresponding to the form of the portion undergoing melt-evaporation of the work is formed in the mask irradiated with a laser beam, the laser beam irradiated in a range larger than the light-transmitting section passes through the light-transmitting section of the mask, to become a beam with a spot form equal to the form of the light-transmitting section.

This beam passes through a reduced image-forming optical system, and as a result, the real image of the light-transmitting section is reduced to the size of said machining spot, to form the reduced image on the work. The portion of the work in the range of the machining spot is melt-evaporated, and the portion not melt-evaporated remains as a desired form.

In this case, if the laser beam passes through the light-transmitting section formed in the mask, the light intensity at the edge portion of the optical beam becomes high due to light interference. So, the portion undergoing melt-evaporation can be well molten also at the area corresponding to the boundary with the portion undergoing no melt-evaporation, and the thermal effect on the portion undergoing no melt-evaporation is small.

As described above, simply by forming the light-transmitting section of the mask with a large area as desired, the real image of the light-transmitting section can be reduced to the size of said machining spot, to form the reduced image on the work. So, when the work is machined, it is not necessary to control the laser beam irradiation position each time.

Furthermore, since the laser beam is not condensed like a point on a work for irradiation as in the conventional method, but is irradiated as said machining spot corresponding to the form of the portion undergoing melt-evaporation, the portion undergoing melt-evaporation can be melt-evaporated generally as a plane not as a point, and the predetermined machining can be accomplished within a short period of time.

This invention also proposes a laser beam machining method, in which a work is irradiated with a laser beam to melt-evaporate the portion irradiated with the laser beam for machining the work, characterized in that a mask with a quadrilateral light-transmitting section that is predetermined times as large as a quadrilateral machining spot is disposed between a laser beam source and the work, and the laser beam transmitted from the laser beam source through a beam-shaping optical system is irradiated to said mask in a range larger than said light-transmitting section, and the real image of the light-transmitting section formed by the transmitted light is reduced to the size of said machining spot by means of a reduced image-forming optical system, to form the reduced image on the work, for machining.

In this case, if the real image-forming position is moved relatively along the laser beam irradiation axis, while the work is machined, the image-forming face can be made to agree with the machined face at each position in the depth direction of the work. So, a well-machined face can be obtained without lowering the machining speed.

Furthermore, if the real image-forming position is reciprocated relatively in the direction perpendicular to the laser beam irradiation axis, while the work is machined, the machining method of this invention can be adapted to a large work.

Moreover, in the case where a work is machined in the direction crossing the axial direction of the work, if the axial direction of the work is held at a setting angle $\alpha$ expressed by $$\alpha = (\pi/2) |\tan^{-1}(d/2f) - \beta$$

(where $\beta$ is the angle of the face to be machined against the work reference face perpendicular to said axial direction, d is the width of the transmitted light incident from the quadrilateral light-transmitting section of the mask on the reduced image-forming optical system, and f is the focal distance of the reduced image-forming optical system) against the laser beam irradiation axis, the face to be machined of the work can be machined at a desired angle.

If the work is relatively revolved around the axis perpendicular to the laser beam irradiation axis, when machined, a surface of revolution such as a semi-spherical surface, conical surface or paraboloid of revolution can be formed.

If the real image-forming position is relatively moved along the laser beam irradiation axis while the work is machined, or if the real image-forming position is relatively reciprocated in the direction perpendicular to the laser beam irradiation axis, when machined, then the work can be adequately machined, depending on the kind and form of machining, the width, thickness and size of the portion to be machined, etc.

The work can be, for example, an optical fiber, and the tip of the optical fiber can be machined variously. If the optical fiber is, for example, fixed in a glass capillary, when machined, it is possible to prevent the vibration of the fiber caused by the ablation during laser beam irradiation and to prevent the occurrence of facial sagging that respectively lower the form accuracy at the cut face formed by laser beam machining, etc.

The present invention also proposes a laser beam machining apparatus for applying the above-mentioned method, characterized in that a mask is disposed between a laser beam source and a work held by a holding means; a light-transmitting section that is predetermined times as large as the laser beam machining spot corresponding to the form of the portion undergoing melt-evaporation of the work is formed in the mask; a shaping optical system for irradiating said mask with a laser beam in a range larger than said light-transmitting section is disposed on the laser beam source side of the mask; and a reduced image-forming optical system for reducing the real image of the light-transmitting section formed by the laser beam passing through the light-transmitting section of the mask, to the size of said machining spot, and for forming the reduced image on the work, is disposed on the work side.

The laser beam machining apparatus can have a constitution in which the work holding means is provided with a rotating means for rotating the work around its axial direction, or a constitution in which a moving means for moving the real image-forming position along the laser beam irradiation axis relatively to the work is provided, or a constitution in which a moving means for reciprocating the real image-forming position in the direction perpendicular to the laser beam irradiation axis relatively to the work is provided.

It is preferred that the laser beam for machining as described above is a multi-mode beam having a flat beam profile, and the light source can be, for example, a TEA-$CO_2$ laser (Transverse Excited Atmosphere $CO_2$ laser).

If a pulsed laser beam is used as the laser beam, the above-mentioned thermal effect can be further inhibited to improve the machining accuracy.

BRIEF DESCRIPTION OF THE DRAWINGS

The numerous objects and advantages of the present invention may be better understood by those skilled in the art by reference to the accompanying Figures, in which.

DETAILED DESCRIPTION OF PREFERRED EMBODIMENTS

Figure 1:
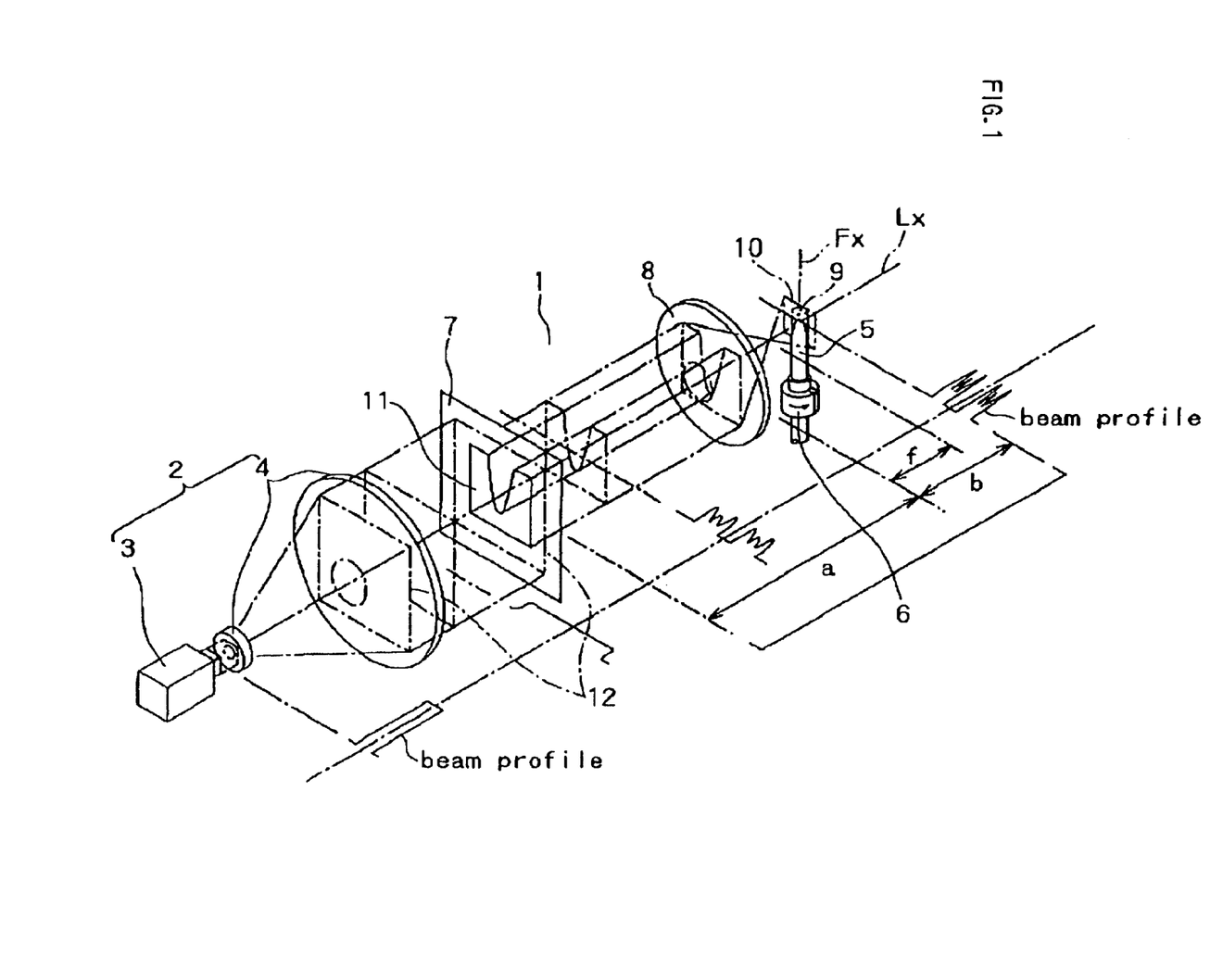
FIG. 1 is an illustrative perspective view showing an example of the laser beam machining apparatus for applying the laser beam machining method of the present invention, and illustrating its action.
Figure 2:
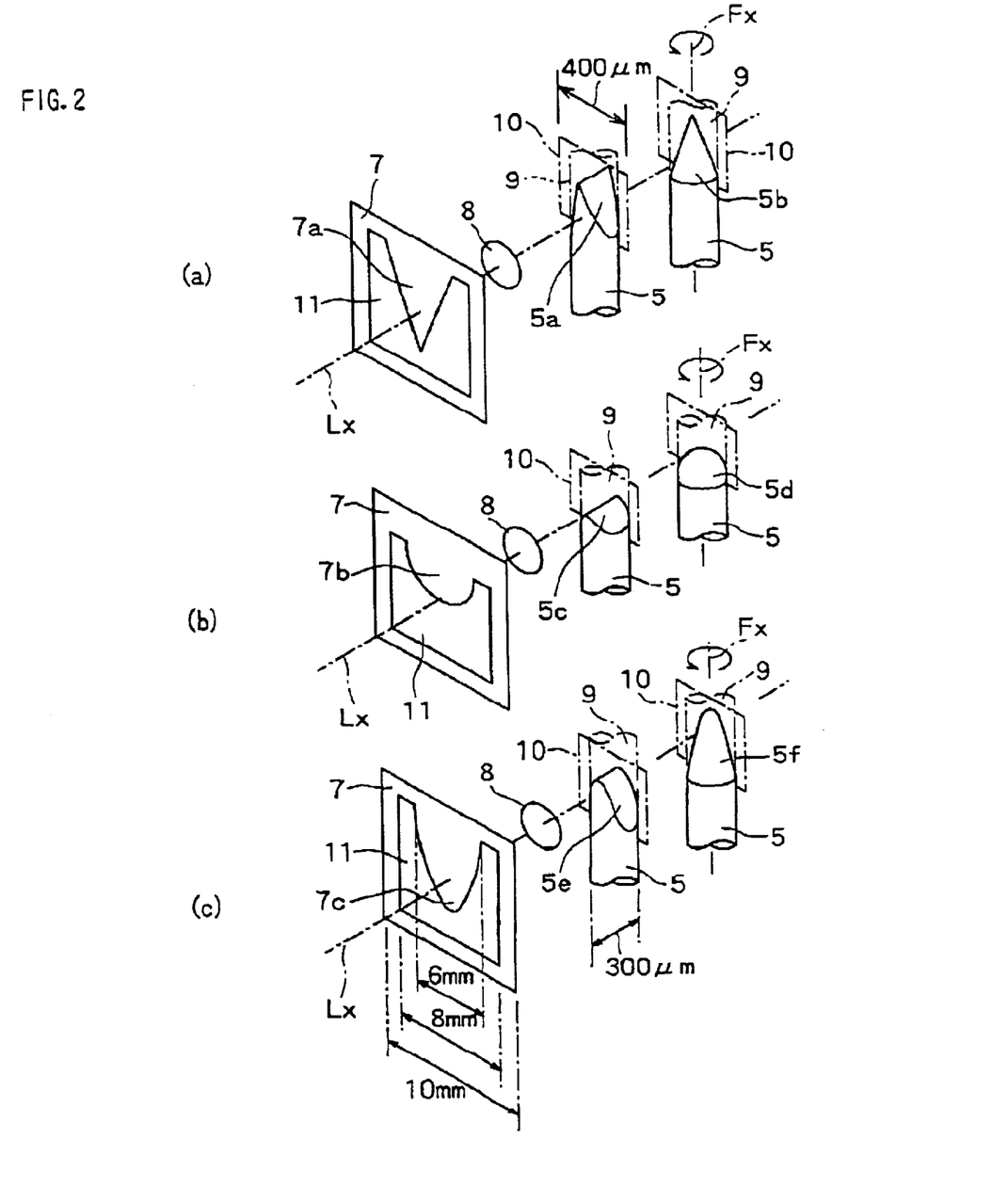
FIG. 2 are illustrative perspective views showing tip forms of optical fibers and masks for obtaining the tip forms by means of the machining of this invention.
Figure 3:
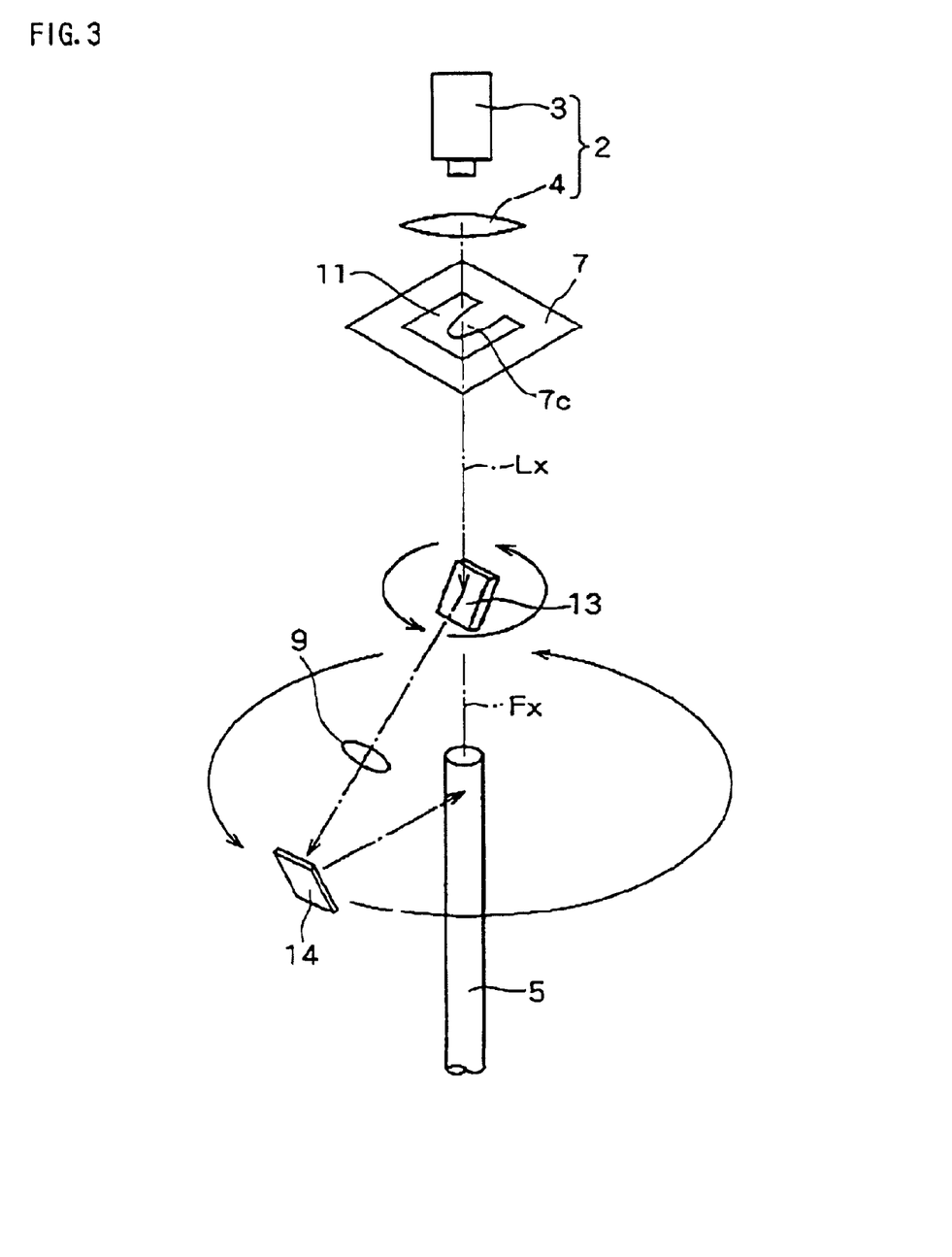
FIG. 3 is an illustrative perspective view showing another example of the laser beam machining apparatus for applying the laser beam machining method of this invention, and illustrating its action.

In reference to FIGS. 1 to 3, an example of this invention is described.

Symbol 1 indicates the laser beam machining apparatus of this invention generally as an example of applying the apparatus for machining an optical fiber. The laser beam machining apparatus 1 is generally composed of a laser beam supply 2 consisting of a pulse TEA-$CO_2$ laser 3 as a laser beam source and a magnifying collimator lens system 4 as a beam-shaping optical system, a rotatable holding member 6 for holding an optical fiber 5 as a work, a mask 7 disposed between the laser beam supply 2 and the optical fiber 5, and a convex lens 8 as a component of a reduced image-forming optical system disposed between the mask 7 and the optical fiber 5.

The laser beam machining apparatus 1 machines the tip of the optical fiber 5, and in the drawings, the machined tip of an optical fiber 5 is expressed by a solid line, and the non-machined tip of an optical fiber 5 is expressed by a one-dot-dash line. Therefore, the portion expressed by the one-dot-dash line indicates the portion undergoing melt-evaporation 9 to be melt-evaporated by laser beam machining, and the portion not to be melt-evaporated, i.e., the portion undergoing no melt-evaporation is the tip of the optical fiber 5 to be machined as desired.

The mask 7 has a light-transmitting section 11 that is predetermined times as large as a laser beam machining spot 10 corresponding to the form of the portion undergoing melt-evaporation 9 of the optical fiber 5, and the real image of the light-transmitting section 11 formed by the light passing through the mask 7 is reduced by the convex lens 8 provided as the reduced image-forming optical system, to the size of said machining spot 10, for forming the reduced image at the tip of the optical fiber 5. Particular examples of the constitution will be described later in detail.

In the above constitution, the laser beam irradiated from the TEA-$CO_2$ laser 3, passing through the magnifying collimator lens 4 and shaped to a parallel beam with an area larger than said light-transmitting section 11 is irradiated to the mask 7, passes through the light-transmitting section 11, is reduced by the convex lens 8 to the size of said machining spot 10, and is irradiated to the tip of the optical fiber 5, to form the real image of the light-transmitting section 11 of the mask 7 on the optical fiber 5, thereby melt-evaporating the portion undergoing melt-evaporation 9 corresponding to the form of the light-transmitting section 11, for machining.

In this machining, in the case where the holding member 6 is not rotated, the tip of the optical fiber 5 is irradiated with the laser beam in one direction, and is machined in the direction. However, in the case where the holding member 6 is rotated, the tip of the optical fiber 5 is irradiated with the laser beam in plural directions of the circumference, and as a result, the surface of a revolving body can be formed at the tip of the optical fiber 5 by means of machining. The rotation of the holding member 6 can be either continuous or stepwise.

In the above case, a pulse TEA-$CO_2$ laser 3 is used as the laser beam source as described above, and the TEA-$CO_2$ laser 3 has a large peak power, and can deliver a multi-mode beam with a flat beam profile as short pulses having a sharp rise. Therefore, since large optical pulse energy can be applied to the portion undergoing melt-evaporation 9 of the optical fiber 5 within a short period of time, the portion undergoing no melt-evaporation is not thermally affected, and only the portion undergoing melt-evaporation 9 can be melt-evaporated for predetermined machining.

Furthermore, for example, it is desirable that the TEA-$CO_2$ laser 3 is operated at a peak power of 1 to 10,000 kW, a pulse width of 0.1 to 50 $\mu$s and an oscillation wavelength of 9 to 11 $\mu$m. For example, the optimum values for machining a quartz optical fiber 5 as a work were 200 kW in peak value, 0.2 $\mu$s in pulse width and 10.6 $\mu$m in oscillation wavelength Moreover, the TEA-$CO_2$ laser 3 is designed, for example, to operate at irradiation intervals of 100 Hz or less. In the case of operation at 100 Hz, where a laser beam with the largest pulse width of 50 $\mu$s is irradiated intermittently required times, the duty ratio is 0.5%, and after laser beam irradiation for 50 $\mu$s, 9950 $\mu$s is the quiescent time. Since the duration of the quiescent time becomes a cooling time, the heat generated by the laser beam escapes during the time, and heat is unlikely to be accumulated in the portion undergoing no melt-evaporation.

Particular examples of the predetermined form of the optical fiber 5 to be machined and the form of the light-transmitting section 11 of the mask 7 are explained below in reference to FIG. 2.

FIG. 2(a) shows a case where the tip of the optical fiber 5 is formed like a wedge by laser beam irradiation in one direction as shown on the left in the drawing, or formed like a cone by several times of laser beam irradiation with the rotation of the holding member 6. The machining spot 10 of the laser beam in this case has such a form as to ensure that a wedge portion 5a or a conical portion 5b as the portion undergoing no melt-evaporation of the optical fiber 5 is not irradiated with the laser beam, and that only the portion undergoing melt-evaporation on the tip side and outside of the portion undergoing no melt-evaporation is irradiated with the laser beam. In correspondence to the machining spot 10, the light-transmitting section 11 of the mask 7 has a form, in which a triangular light-intercepting portion 7a corresponding to the wedge portion 5a or the conical portion 5b on the tip side of the optical fiber 5 is provided in a rectangular opening.

FIG. 2(b) shows a case where the tip of the optical fiber 5 is formed to be semi-cylindrical by laser beam irradiation in one direction as shown on the left in the drawing, or to be semi-spherical by plural times of laser beam irradiation with the rotation of the holding member 6. The machining spot 10 of the laser beam in this case has such a form as to ensure that a semi-cylindrical portion 5c or a semi-spherical portion 5b as the portion undergoing no melt-evaporation of the optical fiber 5 is not irradiated with the laser beam, and that only the portion undergoing melt-evaporation 9 on the tip side and outside of the portion undergoing no melt-evaporation is irradiated with the laser beam. In correspondence to the machining spot 10, the light-transmitting section 11 of the mask 7 has a form, in which a semi-circular light-intercepting portion 7b corresponding to the semi-cylindrical portion 5c or the semi-spherical portion 5d on the tip side of the optical fiber 5 is provided in a rectangular opening.

FIG. 2(c) shows a case where the tip of the optical fiber 5 is formed like a paraboloid by laser beam irradiation in one direction as shown on the left in the drawing, or formed like the surface of a paraboloid by plural times of laser beam irradiation with the rotation of the holding member 6. The machining spot 10 of the laser beam in this case has such a form as to ensure that the paraboloid portion 5e or the rotating paraboloid surface portion 5f as the portion undergoing no melt-evaporation of the optical fiber 5 is not irradiated with the laser beam, and that only the portion undergoing melt-evaporation 9 on the tip side and outside of the portion undergoing no melt-evaporation is irradiated with the laser beam. In correspondence to the machining spot 10, the light-transmitting section 11 of the mask 7 has a form, in which a parabolic light-intercepting portion 7c corresponding to the paraboloid portion 5e or the rotating paraboloid surface portion on the tip side of the optical fiber 5 is provided in a rectangular opening. This form is the same as that shown in FIG. 1.

The magnification of the light-transmitting section 11 in reference to the machining spot 10 is described below. For example, as shown in FIG. 2 in the case where the tip of an optical fiber 5 has a diameter of about 200 to 400 $\mu$m is machined, if the size of the mask 7 is 10 mm×10 mm, the maximum size of the light-transmitting section 11 is about 8 mm×8 mm. So, the magnification can be set at about 20 times.

In this case, since the convex lens 8 as the component of the reduced image-forming optical system reduces the real image of the light-transmitting section 11 to the size of the machining spot 10, for forming the reduced image on the work, the reduction ratio is 1/20, an inverse number of said magnification.

To discuss the positional relation among the mask 7, the convex lens 8 and the optical fiber 5, in the case where the convex lens 8 as the component of the reduced image-forming optical system has a focal distance f, it is only required that those components are disposed to satisfy the following two formulae:

$$(1/f)=(1/a)+(1/b) \quad (1)$$

$$M=b/a \quad (2)$$

where a is the distance between the mask 7 and the convex lens 8; b is the distance between the convex lens 8 and the optical fiber 5; and M is the reduction ratio.

Based on the above, for example, the parameters in the case where a paraboloid surface of 250 $\mu$m in the longitudinal direction is formed at the tip of an optical fiber 5 having a diameter of 230 $\mu$m are as described below.

At first, the machining spot 10 has such a form to ensure that the rotating paraboloid surface portion 5f as the portion undergoing no melt-evaporation of the optical fiber 5 is not irradiated with the laser beam, and that only the portion undergoing melt-evaporation 9 on the tip side and outside of the portion undergoing no melt-evaporation is irradiated with the laser beam. In correspondence to the machining spot 10, the light-transmitting section 11 of the mask 7 has a form, in which a parabolic light-intercepting portion 7c corresponding to the rotating paraboloid surface portion 5f on the tip side of the optical fiber 5 is provided in a rectangular opening as shown in FIG. 1 and FIG. 2(c).

In this case, the machining spot 10 is set to have a size of 400 $\mu$m×400 $\mu$m sufficiently larger than the portion undergoing melt-evaporation 9, to ensure that the portion undergoing melt-evaporation 9 can be perfectly melt-evaporated. On the other hand, the mask 7 used is provided with a light-transmitting section 11 with a form 20 times as large as the machining spot 10.

In this case, the required reduction ratio of the convex lens 8 is M=1/20. If the focal distance of the convex lens 8 is f=100 mm, then, from said formulae (1) and (2):

The distance between the mask 7 and the convex lens 8 is a=2100 mm.

The distance between the convex lens 8 and the optical fiber 5 is b=105 mm.

So, those components should be disposed to satisfy these positional relations.

With the components disposed like this, the optical fiber 5 is set in the holding member 6, and while the holding member 6 is rotated, the laser beam source 3 is actuated to send pulses for machining. In this case, the optical fiber 5 is rotated stepwise at a predetermined angle, say, 30°, and while the fiber stops, it is irradiated with the laser beam.

In this action, for example, a flat multi-mode laser beam with 10.6 $\mu$m wavelength, 0.2 $\mu$s pulse width, almost square spot form, and about 200 kW peak level is pulsed from the TEA-CO$_2$ laser 3, and it is shaped by the magnifying collimator lens system 4 into a parallel beam with an almost square form 12 of about 9 mm per side, and irradiated to the mask 7.

The laser beam passing through the light-transmitting section 11 of the mask 7 becomes higher in the light intensity of its edge portion due to light interference action, and falls on the convex lens 8 used as the reduced image-forming optical system. After it is condensed at the one focal point, an almost square real image with a size corresponding to 1/20 of the size of the light-transmitting section 11 is formed at the tip of the optical fiber 5 to be machined.

In this state, the rotating paraboloid surface 5f as the portion undergoing no melt-evaporation of the optical fiber 5 is not irradiated with the laser beam, and only the portion undergoing melt-evaporation 9 on the tip side and outside of the portion undergoing no melt-evaporation is irradiated with the laser beam. As a result, the machining spot 10 of about 400 $\mu$m×400 $\mu$m melt-evaporates the portion undergoing melt-evaporation 9, to form a desired rotating paraboloid surface of 250 $\mu$m in the longitudinal direction at the tip of the optical fiber 5 having a diameter of 230 $\mu$m.

In this example, since a TEA-CO$_2$ laser is used as the laser beam source, a high output multi-mode beam with a flat beam profile can be delivered in this case as shown in FIG. 1. So, even if the optical fiber 5 is irradiated with a machining spot 10 relatively wider than in the conventional laser beam machining, the portion undergoing melt-evaporation 9 can be well uniformly melt-evaporated in the entire range to assure a high production efficiency.

Moreover, if the laser beam passes through the light-transmitting section formed in the mask, the light intensity at the edge portion of the beam becomes high due to light interference. So, the portion undergoing melt-evaporation can be well molten also at the area corresponding to the boundary with the portion undergoing no melt-evaporation, and the portion undergoing no melt-evaporation is less thermally affected.

Furthermore, the laser beam can also be a continuous wave beam as the case may be, but if a pulsed laser beam is used, the portion undergoing no melt-evaporation of the optical fiber 5 is little affected, and only the portion undergoing melt-evaporation 9 can be efficiently and reliably melt-evaporated and machined.

In the present invention as described above, simply by forming the light-transmitting section of the mask with a large area as desired, the real image of the light-transmitting section can be reduced to the size of the machining spot and the reduced image can be formed on the work. So, it is not necessary to control the laser beam irradiation position accurately each time in the machining of works.

In the example of the laser beam machining apparatus of the present invention described above, when the work is relatively rotated around the axis Fx perpendicular to the laser beam irradiation axis Lx while being machined, the work is rotated, that is, in this case, the holding member 6 of the optical fiber 5 is rotated. However, on the contrary, the laser beam irradiation system can also be rotated.

In FIG. 3, the optical fiber 5 as the work is fixed at the center, and the irradiation system is disposed to rotate for ensuring that the work is irradiated with the laser beam from the circumference.

In the laser beam machining apparatus of FIG. 3, on the extension line of the optical axis Lx of the beam-shaping optical system and the optical axis Fx of the optical fiber 5, a mirror 13 is disposed, to bend the laser beam toward outside, and on the extension line of the bent optical axis, a satellite mirror 14 is disposed. And the mirror 13 and the satellite mirror 14 are interlocked for rotation.

In this constitution, the laser beam irradiated from a laser beam supply 2 is magnified by a beam-shaping optical system into a parallel beam which passes through a light-transmitting section 11 of a mask 7 and bent in optical axis by the mirror 13 toward outside, to pass through a convex lens 8. Then, it is again bent in optical axis by the satellite mirror 14 toward inside, and irradiated to the tip of the optical fiber 5 from just beside. In this case, the reduced real image of the light-transmitting section 11 is formed on the optical fiber 5, for machining as described before.

Figure 4:
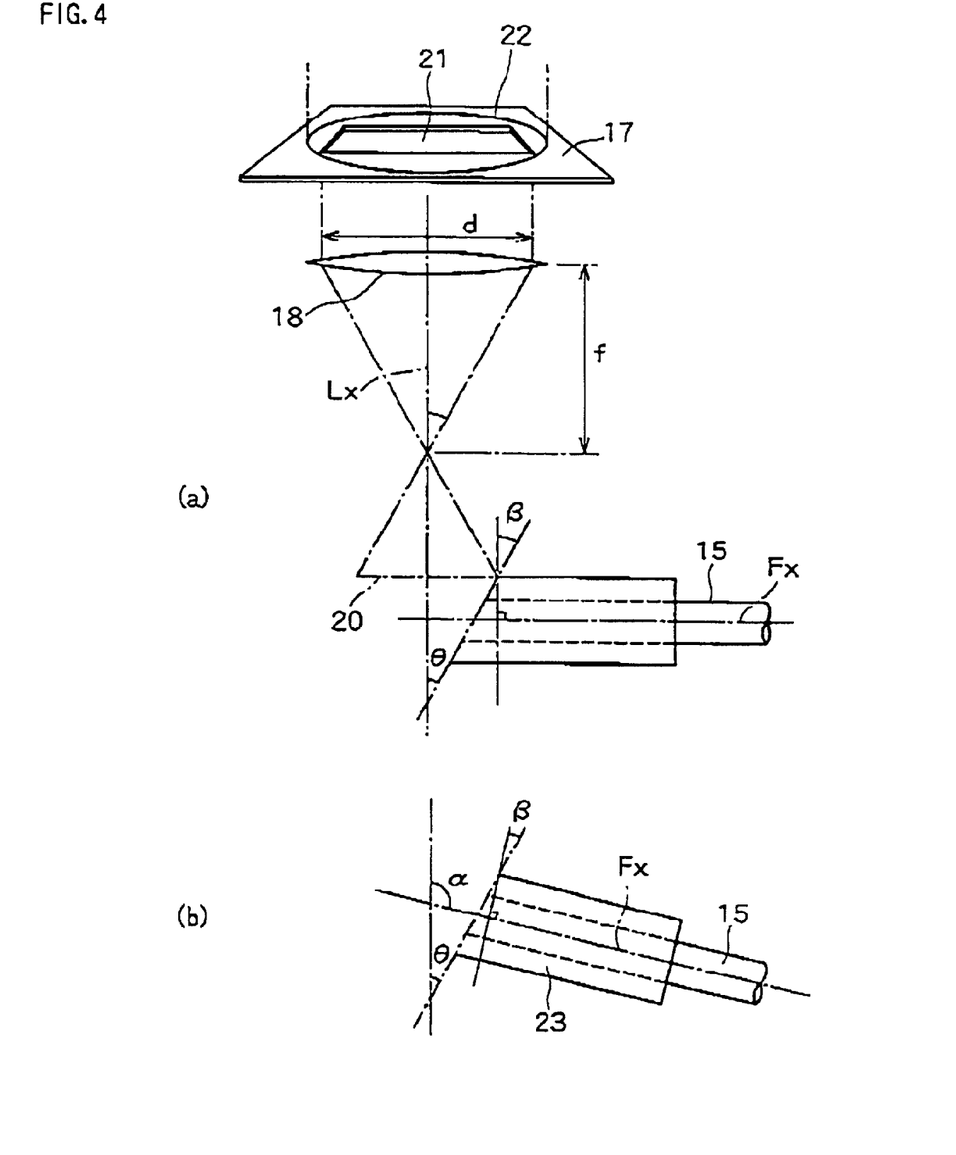
FIG. 4 are illustrations showing a firer other example of the laser beam machining apparatus for applying the laser beam machining method of this invention, and illustrating its action.

FIG. 4 show a further other example of the laser beam machining apparatus of this invention. In the laser beam machining apparatus, the machining spot in the laser beam machining apparatus of the example described above has a quadrilateral (square or rectangular) form, and a mask 17 having a quadrilateral light-transmitting section 21 that is predetermined times as large as the machining spot 20 is disposed between a laser beam source and the work 15, to ensure that the laser beam transmitted from a laser beam source through a beam-shaping optical system is irradiated to the mask 17 in a range 22 larger than said light-transmitting section 21, and the real image of the light-transmitting section 21 formed by the transmitted light is reduced by a convex lens 18 as a reduced image-forming optical system to the size of said machining spot 20, to form the reduced image on the work 15, for machining.

In this example, the work 15 is an optical fiber as in the above-mentioned example, but the optical fiber 15 is fixed in a glass capillary 23.

If the work 15 is machined by means of the above-mentioned laser beam machining apparatus, the facial sagging that occurs without fail in the initial stage of laser beam irradiation occurs on the surface of the glass capillary 23. So, there is a large advantage that the end face of the optical fiber 15 held at the center of the glass capillary 23 is not affected.

If the optical fiber 15 is machined by means of a pulse $CO_2$ laser without using the glass capillary 23, the machining accuracy declines due to the very small vibration of the optical fiber caused by the reaction of the ablation occurring on the surface of the optical fiber when it is irradiated with the laser beam. However, if the optical fiber 15 fixed in the glass capillary 23 is machined, it can be machined at high accuracy since the rigid glass capillary 23 can inhibit the very small vibration of the optical fiber 15.

It is preferred that the glass capillary 23 is made of quartz glass, but a plastic capillary can also be used. The size of the glass capillary 23 can be decided adequately, considering the protection of the fiber inserted and fixed inside and the machining time taken for machining with the laser beam. For example, an adequate range is about 3 to 20 times the diameter of the optical fiber 15.

On the other hand, the optical fiber 15 in the glass capillary 23 is fixed using an adhesive, and though the material of the adhesive is not especially limited since the adhesive is used merely for fixing the optical fiber 15 to the capillary 23, an epoxy adhesive is preferred for an application in which severe temperature characteristics are required for a optical module, etc.

It is preferred that the thickness of the adhesive layer is as thin as possible, since the positional relation between the optical fiber 15 inserted in the capillary 23 and the inner diameter of the capillary 23 can be accurately specified, but if the thickness is too small, the bonding strength declines. So, the thickness of the adhesive can be decided considering these conditions. The thickness of the adhesive layer, i.e., the difference between the inner diameter of the capillary 23 and the outer diameter of the optical fiber 15 can be, for example, about 1 μm to 10 μm.

Figure 5:
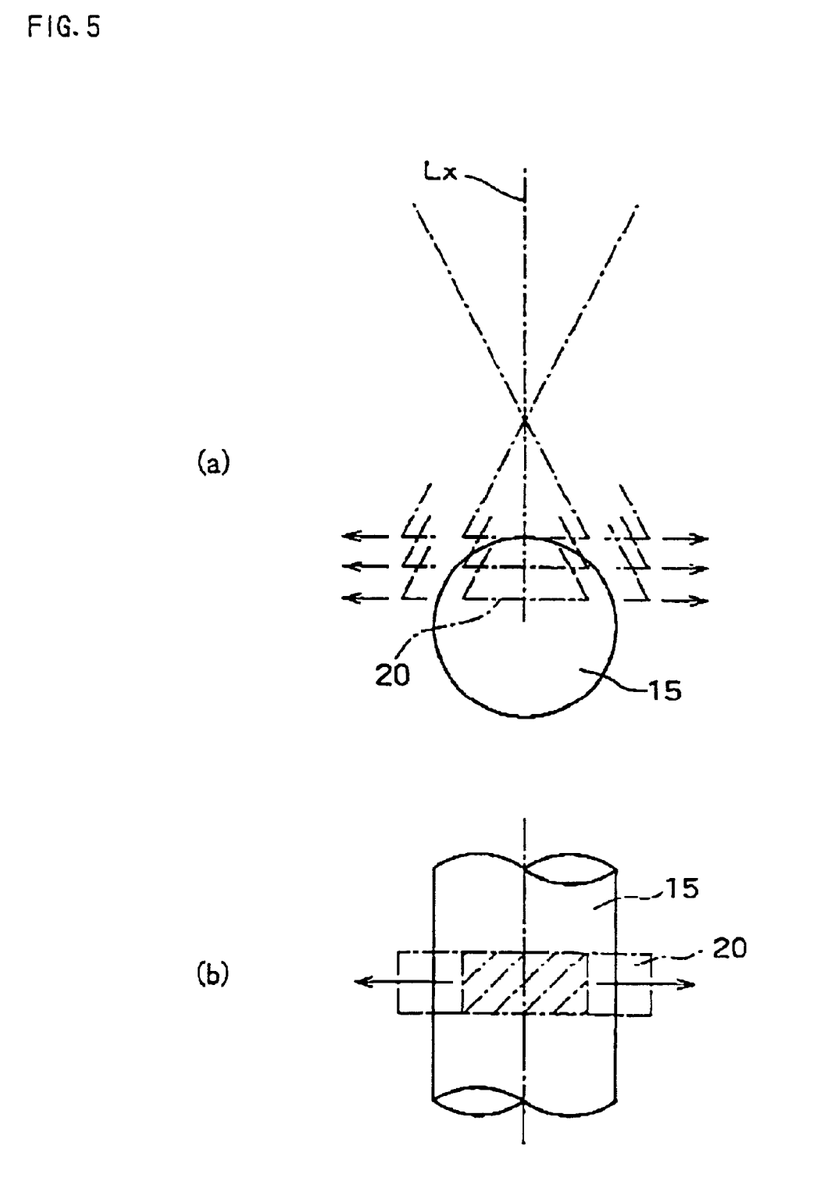
FIG. 5 are illustrations showing a still further other example of the laser beam machining apparatus for applying the laser beam machining method of this invention, and illustrating its action.

In the laser beam machining apparatus, if the real image-forming position is relatively reciprocated in the direction perpendicular to the laser beam irradiation axis Lx, while the work is machined, as shown in FIGS. 5(a), (b), a large work 15 can be machined.

In ordinary laser beam machining, a circular beam is condensed by means of a lens, and the work is machined at the focal point of the lens. In this case, since the spot size at the condensed point is as small as ten-odd micrometers, the machined portion becomes like a thin groove as the machining of the work progresses in the thickness direction. In this case, the impurities and the like contained in the work become gaseous or fumy fine particles which are retained in the thin groove, and since they absorb the laser beam, machinability becomes extremely lower as the groove becomes deeper. Furthermore, the heat generated during machining is accumulated to curve the machined surface.

On the contrary, in the present invention, the machining spot is not like a point unlike the one in the conventional method, but is a square or rectangular form having an area. Therefore, the area to be machined can be large, and hence, the retention of gas or fume generated during machining can be prevented, and the inconvenience involved in the retention can be avoided.

On the other hand, if the position of the image-forming face of said light-transmitting section is moved in the depth direction with the progression of work machining, the machining speed does not decline since the image-forming face can be always kept to agree with the machined face.

For example, when a convex lens 18 as the component of the reduced image-forming optical system was moved in the optical axis direction Lx whenever a laser beam was irradiated using a square machining spot of 200 μm per side, for moving the image-forming face for machining in the depth direction with the progression of machining, as shown in FIG. 5(a) good machined faces could be obtained.

As for the means for moving the image-forming face, instead of the convex lens 18, any other component of the laser beam irradiation system can be moved, or the work 15 can also be moved in the direction of the laser beam irradiation axis Lx.

If the convex lens 18 is moved to move the real image-forming face of the light-transmitting section, i.e., the machining spot 20 in the depth direction of the work, the size of the machining spot becomes smaller as the convex lens 18 is moved in the depth direction of the work 15. As a result, the machined face becomes inclined by a predetermined angle against the laser beam axis.

For the inclination, the following was found. If the inclination angle is θ, the width of the transmitted light incident on the lens 18 of the reduced image-forming optical system from the light-transmitting section 21 of the mask 17 is d, and the focal distance of the lens 18 is f, then the inclination angle θ can be expressed by the following formula.

$$\theta = \tan^{-1}(d/2f)$$

On the other hand, if machining is made as described above, by inclining the optical axis Fx of the fiber by angle α against the laser beam irradiation axis Lx, the angle β of the machined face against the work reference face perpendicular to the optical axis Fx of the fiber 15 is $$\beta = (\pi/2) + \theta - \alpha$$
$$= (\pi/2) + \tan^{-1}(d/2f) - \alpha$$

Formula

Therefore, in the case where the work 15 is machined in the direction crossing the axial direction Fx of the work 15, in order to obtain a desired value as the angle β of the machined face against the work reference face perpendicular to said axial direction Fx, it is necessary that the axial direction Fx of the work 15, i.e., the optical axis Fx of the fiber 15, if the work 15 is an optical fiber, is set at the setting angle α expressed by $$\alpha = (\pi/2) + \tan^{-1}(d/2f) - \beta$$

against the laser beam irradiation axis Lx.

For example, in the case where it is desired to let the machined face agree with the work reference face perpendicular to the optical axis Fx of the fiber 15, because of β=0, it is only required that the setting angle α is set at $$\alpha = (\pi/2) + \tan^{-1}(d/2f)$$

The above description of examples refers to the tip of an optical fiber selected as the work, but the present invention is not limited to it, and can be applied also to other desired materials.

INDUSTRIAL APPLICABILITY

The present invention as described above can machine a work such as an optical fiber into a complicated form within a short period of time without accurately controlling the laser beam irradiation position while inhibiting the decline of machining accuracy due to thermal effect, by using a mask having a light-transmitting section with a form corresponding to the form of the machining spot.

What is claimed is:

1. A laser beam machining method, in which a work is irradiated with a laser beam to melt-evaporate the portion irradiated with the laser beam for machining the work, comprising:

a mask having a light-transmitting section that is predetermined times as large as the laser beam machining spot corresponding to the form of the portion undergoing melt-evaporation of the work, is disposed between a laser beam source and the work, and the laser beam transmitted from a laser beam source through a beam-shaping optical system is irradiated to said mask in a range larger than said light-transmitting section of the mask, and the real image of the light-transmitting section formed by the transmitted light is reduced to the size of said machining spot by means of a reduced image-forming optical system, to form the reduced image on the work, and rotating the work around an axis perpendicular to an axis of the laser beam while the work is being machined by melt evaporation.

2. A laser beam machining method, according to claim 1, wherein the work is an optical fiber, and for irradiating the optical fiber with the laser beam from the lateral face of the optical fiber, to machine the tip of the optical fiber, the form of the machining spot is made to correspond to the form of the tip observed when the optical fiber is viewed in the laser beam irradiation direction.

3. A laser beam machining methods in which a work is irradiated with a laser beam to melt-evaporate the portion irradiated with the laser beam for machining the work, characterized in that a mask with a quadrilateral light-transmitting section that is predetermined times as large as a quadrilateral machining spot is disposed between a laser beam source and the work, and the laser beam transmitted from the easer beam source through a beam-shaping optical system is irradiated to said mask in a range larger than said light-transmitting section, and the real image of the light-transmitting section formed by the transmitted light is reduced to the size of said machining spot by means of a reduced image-forming optical system, to form the reduced image on the work, for machining.

4. A laser beam machining method, according to claim 3, wherein the work is an optical fiber fixed in a glass capillary.

5. A laser beam machining method, according to claim 3, wherein the real image-forming position is relatively moved along the laser beam irradiation axis, while the work is machined.

6. A laser beam machining method, according to claim 3, wherein the real image-forming position is relatively reciprocated in the direction perpendicular to the laser beam irradiation axis, while the work is machined.

7. A laser beam machining method, according to claim 3, wherein in the case where the work is machined in the direction crossing the axial direction of the work, the axial direction of the work is set at the setting angle α expressed by α=(π/2)+tan⁻¹(d/2f)−β (where β is the angle of the face to be machined, against the work reference face perpendicular to said axial direction; d is the width of the transmitted light incident from the square light-transmitting section of the mask on the reduced image-forming optical system; and f is the focal distance of the reduced image-forming optical system) against the laser beam irradiation axis.

8. A laser beam machining method, according to claim 1, wherein the laser beam to be irradiated is a multi-mode beam having a flat beam profile.

9. A laser beam machining method, according to claim 8, wherein the laser beam source is a TEA-$CO_2$ laser.

10. A laser beam machining method, according to any one of claim 1, wherein the laser beam is irradiated to the work as a pulsed beam.

11. A laser beam machining apparatus, for melt evaporating a portion of work irradiated, comprising:

a mask is disposed between a laser beam source and a work held by a holding means;

a light-transmitting section that is predetermined times as large as a laser beam machining spot corresponding to the form of the portion of the work undergoing melt-evaporation;

disposed between the laser beam source and said mask is a shaping optical system for irradiating said mask with a laser beam in a range larger than said light-transmitting section; and a reduced image-forming optical system for reducing a real image of the light-transmitting section formed by the laser beam passing through the light-transmitting section of the mask to the size of said machining spot, and for forming the reduced image on the work, the work holding means being rotatable for rotating the work around an axial direction of the work.

12. A laser beam machining apparatus, according to claim 11, further comprising a moving means for moving a real image-forming position along a laser beam irradiation axis relatively to the work.

13. A laser beam machining apparatus, according to claim 11, further comprising a means for reciprocating the real image-forming position in a direction perpendicular to the laser beam irradiation axis relatively to the work.

14. A laser beam machining apparatus, according to claim 11, wherein the laser beam to be irradiated is a multi-mode beam having a flat beam profile.

15. A laser beam machining apparatus, according to claim 14, wherein the laser beam source is a TEA-$CO_2$ laser.

16. A laser beam machining apparatus, according to claim 11, wherein the laser beam is irradiated to the work as a pulsed beam.

17. A laser beam machining method, in which a work is irradiated with a laser beam to melt-evaporate the portion irradiated with the laser beam for machining the work, wherein:

a mask having a light-transmitting section that is predetermined times as large as the laser beam machining spot corresponding to the form of the portion undergoing melt-evaporation of the work, is disposed between a laser beam source and the work, and the laser beam transmitted from a laser beam source through a beam-shaping optical system is irradiated to said mask in an area larger than said light-transmitting section of the mask, and a real image of the light-transmitting section formed by the transmitted light is reduced to the size of said machining spot by means of a reduced image-forming optical system, to form the reduced image on the work, and the real image-forming position is relatively moved along the laser beam irradiation axis while the work is machined.

18. A laser beam machining method, according to claim 17, wherein the work is an optical fiber, and for irradiating the optical fiber with the laser beam from the lateral face of the optical fiber, to machine the tip of the optical fiber, the form of the machining spot is made to correspond to the form of the tip observed when the optical fiber is viewed in the laser beam irradiation direction.

19. A laser beam machining method, according to claim 17, wherein the laser beam to be irradiated is a multi-mode beam having a flat beam profile.

20. A laser beam machining method, according to claim 17, wherein the laser beam is irradiated to the work as a pulsed beam.

21. In a method of shaping a tip of an optical fiber into a desired form using a laser to melt evaporate a portion of the fiber tip, the improvement comprising:

directing a laser beam from a laser source through a beam-shaping optical system, a mask, a reduced image-forming optical system onto a tip of an optical fiber, in that order, said beam-shaping optical system comprising a magnifying collimator lens system, said mask having a light transmitting aperture therein, the laser beam from the beam-shaping optical system irradiating the mask being larger than the light transmitting aperture in the mask, the light transmitting aperture in the mask being a predetermined times as large as a spot on the tip of the optical fiber to be melt evaporated, the laser beam passing through the aperture in the mask is then reduced by the reduced image forming optical system to form a real image of the aperture in the mask on the tip of the optical fiber, thereby melt evaporating a portion of the fiber tip corresponding to the light transmitting aperture in the mask, the reduced image forming system having a focal distance f, and the tip of the optical fiber to be shaped being spaced from the reduced image forming system a distance greater than f while being melt evaporated in the shaping operation.

22. The method of claim 21, wherein the laser source is a pulse TEA-$CO_2$ laser.

23. The method of claim 21, wherein the beam-shaping optical system is a magnifying collimator lens system to shape the laser into parallel beams.

24. The method of claim 21, wherein the reduced image forming optical system is a convex lens.

* * * * *